Patented Dec. 16, 1941

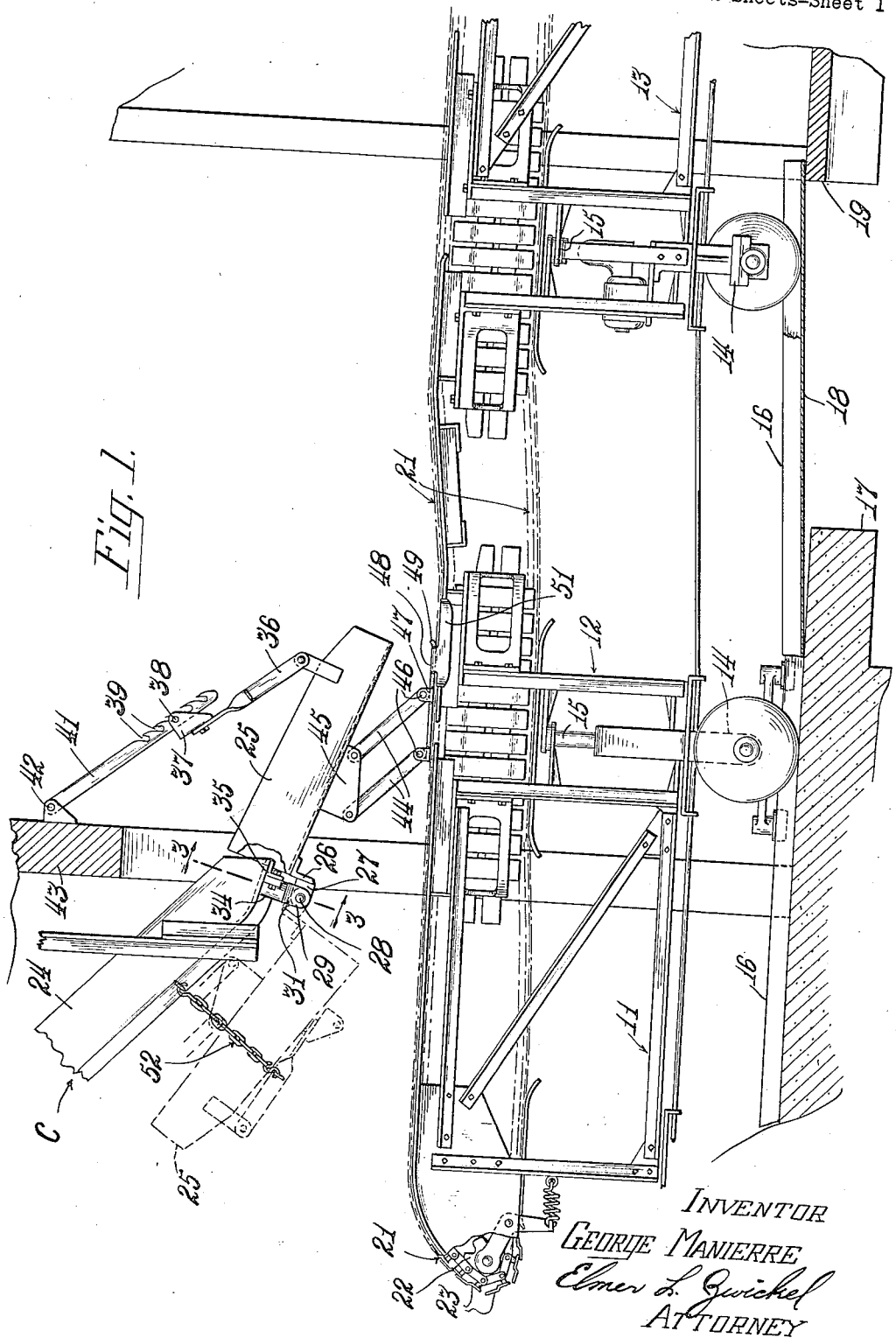

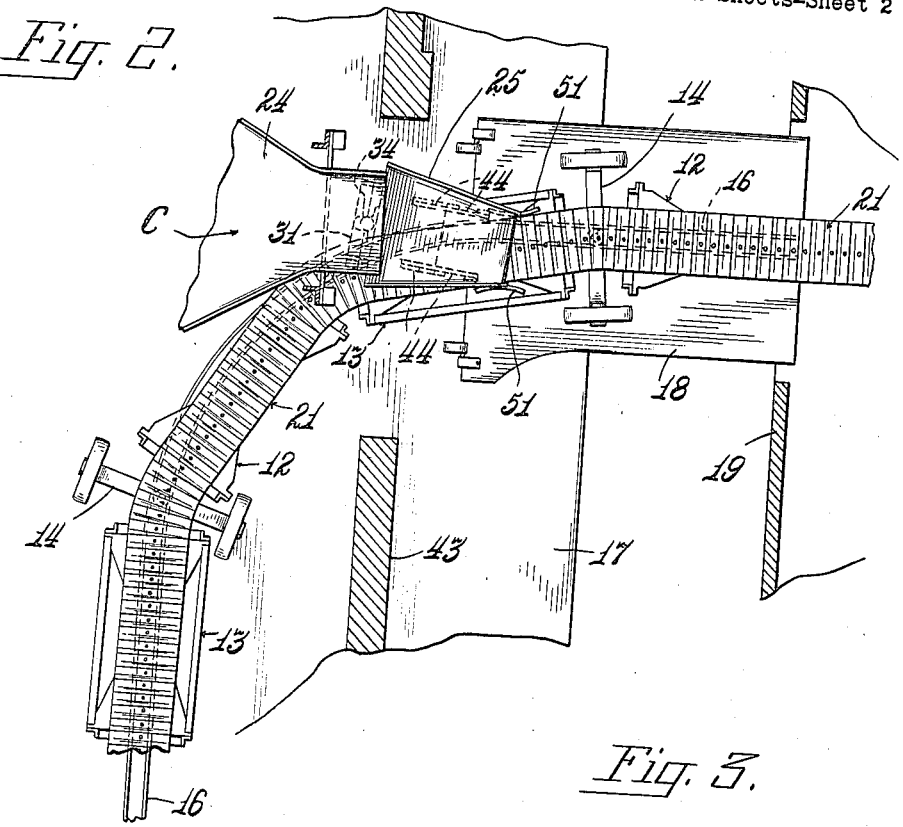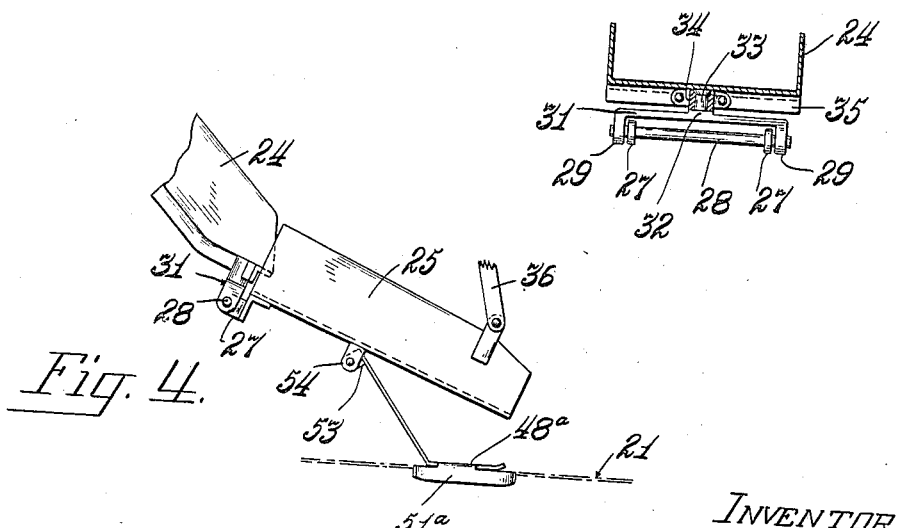

2,266,372

UNITED STATES PATENT OFFICE 2,266,372

CHUTE AND GUIDE MEANS THEREFOR

George Manierre, Milwaukee, Wis.

Application August 2, 1940, Serial No. 349,544

12 Claims. (Cl. 198—52)

This application is a continuation in part of application Serial No. 256,038, filed February 13, 1939.

The invention relates to package handling equipment and more particularly to a novelly constructed chute embodying improved means to facilitate the discharge of material therefrom centrally upon a universally flexible conveyor.

An object of the invention is to provide an adjustable chute with means vertically movable relative thereto arranged to cooperate with a universally flexible conveyor to maintain the discharge end of said chute thereover.

Another object is to provide a universally mounted chute with an improved guide and a mounting.

Another object is to provide inexpensively constructed, easily assembled means to insure the proper discharge of articles upon a universally flexible conveyor associated therewith.

The foregoing and such other objects as will appear hereinafter as the description proceeds will be more readily understood from a perusal of the following specification, in which reference is had to the accompanying drawings, wherein:

Fig. 1 is a side elevational view of the improved chute shown in operative association with a universally flexible conveyor machine.

Fig. 2 is a plan view (on a reduced scale) of the assembly illustrated in Fig. 1 but showing a greater number of frame sections than are shown in said figure.

Fig. 3 is a vertical sectional view taken substantially on line 3—3 of Fig. 1.

Fig. 4 is a side elevational view of a chute having a modified form of guide thereon.

The present invention is primarily concerned with the construction of the chute and its guide means which, in this particular disclosure, is designed primarily for cooperative association with a universally flexible conveyor machine preferably of a type best illustrated and described in my aforementioned co-pending application. To facilitate an understanding of the problems involved herein, a brief description only of the structure and operation of the conveyor machine is deemed necessary.

The conveyor machine illustrated, is designed primarily to afford means for conveying objects such as boxes, bags, barrels and etc., into a box car or other enclosure for convenient discharge adjacent the point of stacking. Efficiency in such a machine is obtained only when said machine is capable of being easily and readily moved around corners and is vertically flexible to compensate for variations in the height of the surface upon which said machine travels.

As illustrated, the machine includes a rear or loading section 11, intermediate sections 12 and 13, and a front or discharge section (not shown). The intermediate sections 12 preferably are vertically flexible while the end sections and the intermediate sections 13 are rigid. Each section is pivotally connected with the adjacent section for horizontal movement to impart limited horizontal flexibility to the frame as a whole, and each section preferably is supported at its ends by suitable wheeled trucks 14, one pivotally mounted in vertical alignment with a vertical pivotal connection 15 between said sections and one at the rear and front ends of the rear and front frame sections, respectively.

As best shown in Fig. 2, a track 16, provided on a loading platform 17 also extends across a hingedly mounted plate 18 which bridges a gap between the loading platform and a box car 19, to provide a guideway for the wheels or other guide means on the trucks of the conveyor machine.

A chain conveyor 21 preferably of the endless type, is carried on the flexible conveyor frame and extends substantially from end to end. As best illustrated in Fig. 1, the loading section 11 of the frame carries an idler sprocket 22 at its rear end and a driven sprocket (not shown) is arranged at the forward or discharged end of the machine for carrying the chain conveyor 21. As the conveyor frame is universally flexible, the conveyor 21 also must be universally flexible to afford uninterrupted operation thereof with a minimum amount of friction. Although the conveyor 21 obviously may be of any suitable construction capable of meeting this requirement, it is preferred that it include a plurality of substantially rectangular flights 23 each offset longitudinally to partly underlie the next adjacent flight.

It will be observed upon viewing Fig. 2, that while the conveyor frame moves around a corner, guided by the track 16, each section 11, 12, or 13 strikes a cord on the curve. As each section leaves or approaches the straight portion of the track the height of the cord from the arc increases or diminishes; consequently, each section and the flexible conveyor carried thereon assume various positions angularly with respect to true contour of the curve. As a result any given point on the longitudinal center of the conveyor constantly shifts transversally.

Certain installations require the positioning of the material discharge chute, indicated generally by letter "C," at the curve, hence said chute must be universally mounted to permit it to easily and automatically adjust itself to the various positions of the conveyor. This is essential if the material discharged therefrom is to be deposited, as required, substantially upon the axis of the conveyor as it passes therebeneath.

To this end, the chute "C" preferably comprises a rigid trough-like portion 24 and a universally mounted trough-like discharge portion 25. As best illustrated in Figs. 1 and 3, the discharge portion 25 has an angle 26 secured to its bottom adjacent its rear or receiving end, provided with transversally aligned bearings 27. The bearings extend rearwardly and receive a trunnion 28 journalled at its extended ends in spaced depending ears 29 on a bracket 31. A boss 32, centrally arranged on said bracket, has a vertical pintle 33 journalled in a bearing bracket 34 which is fixedly secured to the rear face of a reinforcing angle 35 arranged on the bottom face of the discharge end of the rigid chute portion 24.

This construction affords vertical arcuate movement of the chute portion 25 to compensate for various elevations of the conveyor machine and further allows said chute to swing readily through an arc in a substantially horizontal plane to follow the constantly shifting position of the moving conveyor therebeneath. The chute portion 25 preferably is held in an adjusted position vertically by providing a bail 36 at its forward end having a substantially U-shaped bracket 37 centrally arranged thereon which carries a pin 38 to co-act with one of a plurality of notches 39 in a hanger bar 41 rigidly secured, at 42, to the warehouse wall 43 or other suitable support.

It should be apparent at this time that means must be provided to swing the discharge end of the chute 25 through its horizontal plane for vertical alignment with the conveyor. To this end, two pairs of links 44, of equal length, are provided on the lower face of the chute portion 25, each pair being pivotally connected to a vertically disposed substantially triangularly shaped plate 45. The lower ends of said links are each pivotally attached as at 46 to spaced ears 47 on a substantially rectangular guide plate 48. As shown, plate 48 has its forward edge 49 terminate in substantial vertical alignment with the discharge end of the chute portion 25 and it rests at all times upon the surface of the universally flexible conveyor 21. Due to its connection through the two sets of parallel links 44, the guide plate remains in a substantially horizontal plane irrespective of its vertical elevation which constantly varies as the conveyor machine moves over elevations, depressions, or inclines on its supporting surface.

A pair of shoes 51 are arranged on the guide plate 48 and said shoes preferably are arcuate as shown and are disposed one on each side of the said guide plate to depend therefrom and co-act with the longitudinal edges of the flexible conveyor 21. It should be evident at this time that the cooperative engagement of the shoes 51 with the conveyor 21 tends to swing the chute portion 25 about its vertical pivot 33—34 to maintain its discharge end in longitudinal alignment vertically with the axis of the conveyor.

The universal mounting of the chute portion 25 also facilitates manual swinging of said portion out of the way. In that event said chute portion assumes a position substantially as illustrated in dotted lines in Fig. 1 and is detachably retained in that position by a chain or other hanger element 52.

The chute-guide structure shown in Fig. 4 and also disclosed in my said co-pending application, is substantially like that previously described except in the detail construction of the guide plate 48a and its mounting.

As illustrated, the guide plate 48a includes spaced apart depending shoes 51a arranged to co-act with the longitudinal edges of the conveyor 21. The rear end portion of said plate extends angularly upwardly and terminates in a bearing portion 53, suitably journalled in lugs 54 depending from the bottom face of the movable chute portion 25. The construction of the chute portion 25 and its universal mounting is identical to the disclosure in Fig. 1. The essential difference in the function and operation of the modified form of guide means is such that a wide variation in the elevation of the conveyor 21 is impractical. This is because an extensive variation in said elevation will cause the guide plate 48a to tilt upwardly or downwardly thus presenting an obstacle, in the form of a line contact with the conveyor, which may be struck by the moving conveyor and consequently cause it to jam. However, for installations wherein the conveyor machine operates on a substantially level supporting surface, the structure of Fig. 4 is very practicable and frequently desirable due to its simple construction.

Although exemplary forms of the improved universally adjustable controlled discharge or delivery chute have been shown in detail in the accompanying drawings and described in detail in the foregoing specification it is to be understood that the disclosure is one of example and not limitation and that it is not desired to be restricted to the precise details but to embrace said variations as may fall within the spirit of the invention and the scope of the appended claims.

I claim:

1. The combination with a universally flexible conveyor machine including an endless universally flexible conveyor, of a pivotally mounted chute arranged to deliver articles to said conveyor, a guide on said chute, said guide including a plate arranged to rest on said conveyor, and shoes on said plate adapted to embrace opposite edges of the flexible conveyor to maintain the discharge end of the chute in substantial vertical alignment with said flexible conveyor.

2. The combination with a conveyor machine including a flexible conveyor, of a horizontally and vertically movable chute arranged to deliver articles to said conveyor, means to secure said chute in a vertically adjusted position, and means on and movable vertically relative to the chute adapted to co-act with the flexible conveyor to maintain the discharge end of said chute in substantial alignment with said flexible conveyor.

3. The combination with a conveyor machine including a flexible conveyor, of a chute arranged to deliver articles to said conveyor, a horizontally and vertically pivotal mounting at the receiving end of said chute, means at the discharge end of said chute to retain it in a vertically adjusted position, a guide pivotally attached to said chute for vertical movement relative thereto substantially midway between its ends, and means on said guide adapted to co-act with the conveyor to maintain the discharge end of said chute in substantial alignment with said conveyor.

4. The combination with a conveyor machine including a flexible conveyor, of a chute arranged to deliver articles to said conveyor, a horizontally and vertically pivotal mounting at the receiving end of said chute, a guide, links connecting said guide with said chute, and means on said guide adapted to co-act with the conveyor to maintain the discharge end of said chute in substantial alignment with said conveyor.

5. The combination with a conveyor machine including a universally flexible conveyor, of a horizontally movable chute arranged to deliver articles to said conveyor, a plurality of links each pivotally connected at one end to said chute, a substantially horizontal guide pivotally connected to the free ends of said links, and means on said guide adapted to co-act with the conveyor to maintain the discharge end of said chute in substantial vertical alignment with said conveyor.

6. A chute arranged to discharge articles on a universally flexible conveyor associated therewith, a universal pivotal mounting at one end of said chute, means to secure said chute in a vertically adjusted position, a guide for the chute arranged below and movable vertically independently of said chute, and means on said guide adapted to co-act with the flexible conveyor to maintain the discharge end of the chute in substantial alignment with the conveyor.

7. A universally adjustable chute including means to maintain its discharge end in alignment with a universally flexible conveyor, said means comprising, in combination, a guide plate arranged to rest on said conveyor, and links constituting two sides of a parallelogram movably connecting said plate with said chute, said links maintaining said guide plate substantially horizontal irrespective of its position relative to said chute.

8. A chute comprising, in combination, an elongated channel-shaped member adapted to discharge articles on a universally flexible conveyor associated therewith, a universally pivotal mounting for the article receiving end of said member, adjustable means to support the discharge end of said member at a predetermined elevation, a guide on said member, and means on said guide adapted to co-act with the conveyor to maintain the discharge end of said member substantially in alignment with the longitudinal center of said conveyor, said guide being movable vertically independently of the member to compensate for variations in the elevation of the conveyor.

9. A chute including a trough-like member hingedly mounted at one end for pivotal movement horizontally and vertically, means co-acting with the other end to retain said member in a vertically adjusted position, and means on said member arranged to co-act with a conveyor associated therewith to cause said member to swing horizontally about its mounting.

10. The combination with a conveyor machine including a flexible conveyor, of a chute having a horizontally movable discharge portion arranged to deliver articles to said conveyor, a guide on said discharge portion adapted to coact with the conveyor to maintain the discharge end of said portion in substantial alignment with said conveyor, said guide being pivotally connected to said portion for vertical movement independently of said portion.

11. A chute including a discharge portion mounted at one end for pivotal movement in a horizontal plane, a guide, links connecting said guide with said discharge portion, and means on said guide adapted to co-act with a conveyor to maintain the discharge portion in vertical alignment with the conveyor.

12. A chute including a discharge member hingedly mounted at one end for pivotal movement horizontally and vertically, means co-acting with the other end to retain said member in a vertically adjusted position, a guide, and links connecting the guide with the discharge portion whereby said guide is free to move vertically only relative to said discharge portion, said guide being adapted to co-act with a conveyor.

GEORGE MANIERRE.